(12) United States Patent
Lecollinet et al.

(10) Patent No.: US 12,396,457 B2
(45) Date of Patent: Aug. 26, 2025

(54) LAMINARIN BASED FORMULATION FOR AGRICULTURAL APPLICATIONS

(71) Applicants: UPL Corporation Limited, Port Louis (MU); UPL Europe LTD, Cheshire (GB)

(72) Inventors: Gregory Lecollinet, Port Louis (MU); Alan Bruno Pirotte, Port Louis (MU)

(73) Assignees: UPL CORPORATION LIMITED, Port Louis (MU); UPL EUROPE LTD, Cheshire (GB)

( * ) Notice: Subject to any disclaimer, the term of this patent is extended or adjusted under 35 U.S.C. 154(b) by 431 days.

(21) Appl. No.: 17/917,282

(22) PCT Filed: Apr. 21, 2021

(86) PCT No.: PCT/IB2021/053291
§ 371 (c)(1),
(2) Date: Oct. 6, 2022

(87) PCT Pub. No.: WO2021/214684
PCT Pub. Date: Oct. 28, 2021

(65) Prior Publication Data
US 2023/0157285 A1    May 25, 2023

(30) Foreign Application Priority Data

Apr. 22, 2020  (IN) .............................. 202011017328

(51) Int. Cl.
| | | |
|---|---|---|
| *A01N 43/16* | (2006.01) | |
| *A01N 25/02* | (2006.01) | |
| *A01P 3/00* | (2006.01) | |
| *A01N 59/02* | (2006.01) | |
| *A01N 59/20* | (2006.01) | |

(52) U.S. Cl.
CPC ............ *A01N 43/16* (2013.01); *A01N 25/02* (2013.01); *A01P 3/00* (2021.08); *A01N 59/02* (2013.01); *A01N 59/20* (2013.01)

(58) Field of Classification Search
None
See application file for complete search history.

(56) References Cited

U.S. PATENT DOCUMENTS

| | | | |
|---|---|---|---|
| 4,125,392 A | 11/1978 | Primo | |
| 5,750,472 A | 5/1998 | Yvin et al. | |
| 8,871,923 B2 * | 10/2014 | Buonatesta | A01N 59/00 536/55.1 |
| 2014/0231890 A1 * | 8/2014 | Basker | H10D 86/215 257/296 |
| 2015/0045221 A1 | 2/2015 | Buonatesta et al. | |
| 2017/0231890 A1 | 8/2017 | Pernodet et al. | |

FOREIGN PATENT DOCUMENTS

| | | |
|---|---|---|
| CN | 105188362 A | 12/2015 |
| CN | 108473940 A | 8/2018 |
| EP | 0649279 A1 | 4/1995 |
| WO | 2004082381 A1 | 9/2004 |
| WO | 2013141715 A1 | 9/2013 |

OTHER PUBLICATIONS

First Examination Report for European Patent Application No. 21722550.7, Date of Mailing: Mar. 22, 2024; 5 pages.
Hearing Notice in Indian Application No. 202011017328, Date of Mailing: Apr. 22, 2024, 2 pages.
ARIPO Examination and Search Report dated Oct. 9, 2024 in corresponding ARIPO patent application No. AP/P/2022/014415, 6 pages.
Feliziani, E. et al.; "Preharvest treatments with chitosan and other alternatives to conventional fungicides to control postharvest decay of strawberry"; Carbohydrate Polymers, vol. 132; 2015; pp. 111-117; doi:10.1016/J.CARBPPOL.2015.05.078.
Garde-Cerdán, T. et al.; "Chitosan and Laminarin as Alternatives to Copper for Plasmopara viticola Control: Effect on Grape Amino Acid"; Journal of Agricultural and Food Chemistry, vol. 65, Issue No. 34; 2017; pp. 7379-7386; doi:10.1021/acs.jafc.7b02352.
International Search Report and Written Opinion for International Application PCT/IB2021/053291; International Filing Date: Apr. 21, 2021; Date of Mailing: Jul. 14, 2021; 11 pages.
Romanazzi, G. et al.; "Impact of Alternative Fungicides on Grape Downy Mildew Control and Vine Growth and Development"; Plant Disease, vol. 100, Issue No. 4; 2016; pp. 739-748; doi:10.1094/PDIS-05-15-0564-RE.
Office action of the corresponding Ukraine application No. a 2022 03948 dated Jan. 17, 2025.
Feliziani, et al. Preharvest treatments with chitosan and other alternatives toconventional fungicides to control postharvest decay of strawberry. Carbohydratepolymers, 5:111-117. (2015).
Garde-Cerdán, et al. Chitosan and Laminarin as Alternatives to Copper forPlasmopara viticola Control: Effect on Grape Amino Acid. Journal of agricultural and foodchemistry, 65:7379-7386. (2017).
Chinese Office Action for Chinese Patent Application No. 202180030354.9 dated May 30, 2025.

* cited by examiner

*Primary Examiner* — Nannette Holloman
(74) *Attorney, Agent, or Firm* — CANTOR COLBURN LLP

(57) ABSTRACT

The present invention relates to a composition comprising water soluble actives such as laminarin. Particularly, the present invention relates to a stable composition comprising water soluble actives such as laminarin and a polyol. The present invention also relates to a process for the preparation of said composition and method of use thereof.

12 Claims, No Drawings

LAMINARIN BASED FORMULATION FOR AGRICULTURAL APPLICATIONS

CROSS REFERENCE TO RELATED APPLICATIONS

This application is a National Stage application of PCT/IB2021/053291, filed Apr. 21, 2021, which claims priority to Indian Patent Application number 202011017328, filed Apr. 22, 2020, both of which are incorporated by reference in their entirety herein.

FIELD OF INVENTION

The present invention relates to a composition comprising water soluble actives. The present invention also relates to a process for the preparation of said composition and method of use thereof.

BACKGROUND OF THE INVENTION

Laminarin is a polysaccharide derived from seaweed, a polymer of simple sugars linked together by glycosidic bonds. More specifically, it is a class of storage β-glucans comprised of β-(1-3)-linked glucose residues with some β-(1-6)-intrachain linkages, and some 6-O-branching in the main chain. D-mannitol occurs at 2-3% of reducing termini and these chains are referred to as M chains, while those with glucose at the reducing termini are known as G chains. The exact molecular structure of laminarin varies depending on environmental factors such as water temperature, salinity and nutrient salts, waves, sea current and immersion depth. Its chemical formula is $C_{18}H_{32}O_{16}$ (University of Hertfordshire 2014; ChEBI 2015; Kadam, Tiwari and O'Donnell 2015).

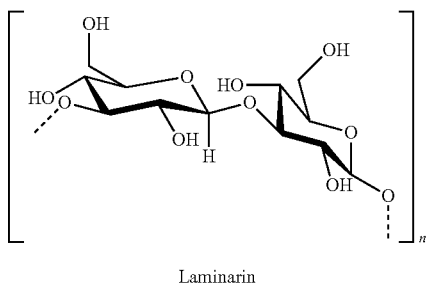

Laminarin

Brown algae may contain up to 35% laminarin on a dry weight basis, depending on species, season, habitat and extraction method. Laminarin is generally extracted from brown algae of the Pheophyceae type, and in particular the Fucales or the Laminariales. Laminarin is known to use as a seed germination and plant growth accelerator (biostimulant).

Laminarin can be extracted starting from a raw material consisting of brown algae, especially using the method disclosed in the French patent FR 9208387. The formulated product (Vacciplant) for laminarin (EPA registered) contains 3.51% laminarin as the active ingredient, surfactant (<10%) and two different preservatives (each <1%) that are permitted for use as food additives.

Various scientific publications describe the properties of laminarin, suggesting its use for enhancing plant defense reactions.

NETZER et al. reveal that an infection with the pathogen *S. oxysporum* triggers the induction of laminarinase (Biological abstracts, vol. 68, no. 1, 1979).

BONHOFF et al. reveal the properties of laminarin as an elicitor of phytoalexin and callose (Biological abstracts, vol. 86, no. 4, 1988).

KUROSAKI et al. (Biological abstracts, vol. 85, no. 2, 1988) and PEARCE (Biological abstracts, vol. 74, no. 8, 1982) confirm the eliciting effects of laminarin, in particular in respect of lignification, while at the same time stating that these effects are weak compared with those of the known elicitors.

The challenge involved in developing commercially acceptable products containing agriculturally active compounds continues to increase due to the rapid emergence of more complex customer and regulatory requirements. These agricultural compositions must exhibit excellent chemical stability and must also maintain a high level of physical stability under a severe range of storage and use conditions. Handling of a liquid product in bulk storage facilities represents a special challenge because the product can be subject to high shear forces at both high and low temperatures. This emerging area of performance is critical to customer satisfaction and commercial success with a product. At the same time the demand on the agrochemical composition performance has been increasing, the number of auxiliary chemicals approved for use in agrochemical compositions by the various regulatory authorities has been decreasing due to more stringent standards for the toxicological and ecological properties of these materials.

The agrochemical compositions are generally prepared using one or more adjuvants sometimes in specific combinations to provide optimum biological activity. Sometimes the stability of the formulation may be disturbed, and one or more component separates out, for example as a discrete phase. In general, the separation of a discrete phase from an agrochemical is highly undesirable, particularly when the formulation is sold in bulk containers. In these circumstances it is virtually impossible to re-homogenize the formulation and to achieve even distribution of the components for application. Furthermore, the formulation must be stable in respect of storage for prolonged periods in both hot and cold climates. These all factors present formidable problems to the formulator.

There is a need in the art for solvent system to develop a formulation that has both unique performance characteristics and a good physicochemical stability.

Advantages of the Invention

It is an advantage of the present invention to provide a composition comprising a water soluble active which is devoid of any haziness or phase separation and imparts good stability to the final product even at low temperatures.

Yet another advantage of the invention is a composition of water soluble active having enhanced bioefficacy.

Further advantage of the present invention is a process for preparing a formulation comprising a water soluble active alone or in combination as described herein in this specification.

Yet another advantage of the present invention a composition that exhibits excellent chemical and physical stability under a severe range of storage and use conditions.

These and other advantages of the present invention would be apparent from the description of the invention set out hereinafter.

SUMMARY OF THE INVENTION

Accordingly, in one aspect, the present invention provides a composition comprising:
i) a water soluble active ingredient; and
ii) a polyol.

In another aspect the present invention provides a composition comprising:
i) laminarin; and
ii) a polyol.

In another aspect the present invention provides a stable liquid composition comprising:
i) laminarin; and
ii) a polyol.

In another aspect the present invention provides an aqueous composition comprising:
i) laminarin; and
ii) a polyol.

In another aspect, the present invention relates to an improved composition comprising laminarin as a bio stimulant and process for preparing said composition.

In yet another aspect, the present invention provides a method for use of said composition comprising applying a composition according to the present invention at the desired location.

In another aspect, the present invention provides a kit comprising stable composition according to the present invention as a biopesticide.

DETAILED DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about".

Thus, before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. Unless otherwise defined, all technical and scientific terms used herein have the same meaning as commonly understood by one of ordinary skill in the art to which this invention pertains. In the case of conflict, the present document, including definitions will control.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

The present inventors have surprisingly found that when polyol as solvent present in the composition comprising a water soluble active provides stable formulation.

Preferably, the composition according to the present invention is an aqueous formulation. Accordingly, the present invention provides a composition comprising water soluble active agent and polyol as solvent. It has been found that a composition comprising polyol as solvent along with active ingredient is physicochemically stable even after a prolonged storage at different conditions.

Accordingly, in one aspect, the present invention provides a composition comprising:
i) a water soluble active ingredient; and
ii) a polyol.

In an embodiment the water soluble active is laminarin.

It has been known that laminarin and compositions in which it is present increase the production yield of agricultural products by exerting an accelerating action on plant growth, cell elongation and seed germination.

Advantageously, the composition may contain from 0.005 to 600 parts by weight of laminarin and preferably from 1 to 250 parts by weight when it is in solid form, and from 0.005 to 100 parts by weight of laminarin when it is in liquid form.

In an embodiment, the present invention provides a liquid composition comprising from about 0.005 to 100 parts by weight of laminarin.

In an embodiment, the present invention provides a liquid composition comprising from about 0.5 to 100 parts by weight of laminarin.

In an embodiment, the present invention provides a liquid composition comprising from about 1 to 80 parts by weight of laminarin.

In an embodiment, the present invention provides a liquid composition comprising from about 10 to 50 parts by weight of laminarin.

In an embodiment, the parts refer to the parts by weight of the composition in grams.

In an embodiment, the present invention provides a liquid composition comprising about 37 g by weight of laminarin.

In an embodiment, the present invention provides a liquid composition comprising about 45 g by weight of laminarin.

In an embodiment, the composition may comprise about 46.8% by total weight of laminarin.

In an embodiment, the composition may comprise about 57% by total weight of laminarin.

As used herein, the term "polyol" includes any compound having at least one hydroxyl group on each of two adjacent carbon atoms that are not in trans configuration relative to each other. The polyols can be acyclic or cyclic, substituted or unsubstituted, or mixtures thereof, so long as the resultant complex is water soluble and agrochemically acceptable.

In an embodiment, the present composition comprises at least one polyol and the polyol is selected from acyclic polyol and cyclic polyol.

Examples of such polyol compounds include: sugars, sugar alcohols, sugar acids and uronic acids. Preferred polyols are sugars, sugar alcohols and sugar acids, including, but not limited to: mannitol, glycerin, xylitol and sorbitol. Especially preferred polyol is glycerin.

In an embodiment, polyol can be selected from ethylene glycol, propylene glycol, butylene glycol, diethylene glycol, triethylene glycol, dipropylene glycol, glycerol and trimethylolpropane.

Other polyols for example diglycerol, triglycerol, tetraglycerol, pentaglycerol, hexaglycerol, heptaglycerol, octaglycerol, nonaglycerol, decaglycerol, pentadecaglycerol, eicosaglycerol and triacontaglycerol and the like may also be used.

In one embodiment the polyol used in the present invention is glycerol.

In an embodiment, the polyol is used in an amount from about 0.005 to 90% w/w of total composition.

In an embodiment, the polyol is used in an amount from about 1 to 70% w/w of total composition.

In an embodiment, the polyol is used in an amount from about 1 to 50% w/w of total composition.

In an embodiment, the polyol is used in an amount from about 1 to 40% w/w of total composition.

In an embodiment, the polyol is used in an amount from about 1 to 30% w/w of total composition.

In a preferred embodiment, the polyol is used in an amount from about 10 to 40% w/w of total composition.

In an embodiment, the polyol is used in an amount of about 35% w/w of total composition.

Accordingly, the present invention provides a composition comprising an effective amount of laminarin and polyol in an amount from about 0.005 to 90% w/w of total composition.

Accordingly, the present invention provides a composition comprising from about 0.005 to 600 grams by weight of laminarin and polyol in an amount from about 0.005 to 90% w/w of total composition.

In one embodiment, the present invention provides an aqueous composition comprising from about 0.005 to 600 grams by weight of laminarin and polyol in an amount from about 0.005 to 90% w/w of total composition.

An important advantage of the present invention is that when polyol for example glycerine is used in the formulation it acts as a preservative, as well as inhibits laminarin crystal growth under 60-70° C.

It was found that use of glycerin in laminarin formulations unexpectedly improve the laminarin solubility in water-based formulations.

According to the present invention there is no need to add thickener into Vacciplant® formulations (containing laminarin) to suspend laminarin particles over time.

Therefore, in an embodiment, the composition of the present invention is substantially free of a thickener.

In another embodiment, preparation of a composition containing an effective amount of laminarin, optionally incorporated with an agriculturally acceptable carrier or vehicle.

In another embodiment, the composition can be presented in solid form, especially in the form of powders or granules, or in liquid form, especially in the form of aqueous solutions.

In another embodiment, the composition also contains at least one additional substance selected from deficiency-correcting elements, fungicides, insecticides, herbicides, growth hormones, lipoamino acids and betaines.

Another embodiment of the present invention provides a composition comprising:
i) a water soluble active ingredient;
ii) a polyol; and
iii) at least one additional substance selected from deficiency-correcting elements, fungicides, insecticides, herbicides, growth hormones, lipoamino acids and betaines.

In an embodiment, the additional substance is a fungicide.

In an embodiment, the fungicide is a multi-site fungicide. The multi-site contact fungicide may be selected from copper fungicides, dithiocarbamate fungicides, phthalamide fungicides, chloronitrile fungicides, sulfamide fungicides, guanidine fungicides, triazines fungicides and quinone fungicides.

In an embodiment, the additional substance is a copper fungicide. The copper fungicides of the present invention are inorganic compounds containing copper, typically in the copper (II) oxidation state and are preferably selected from copper oxychloride, copper sulfate, copper hydroxide and tribasic copper sulfate (Bordeaux mixture).

In an embodiment, the additional substance is sulfur. The sulfur fungicides of the present invention are inorganic chemicals containing rings or chains of sulfur atoms and is preferably elemental sulfur.

In an embodiment, the additional substance is a dithiocarbamate. The dithiocarbamate fungicides of the present invention contain a dithiocarbamate molecular moiety and are selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the additional substance is a phthalimide fungicide. The phthalamide fungicides of the present invention contain a phthalamide molecular moiety and are selected from folpet, captan and captafol.

In an embodiment, the additional substance is a chloronitrile fungicide. The chloronitrile fungicide of the present invention comprises an aromatic ring substituted with chloro- and cyano-substituents and is preferably chlorothalonil.

In an embodiment, the additional substance is a sulfamide fungicide. The sulfamide fungicides of the present invention are preferably selected from dichlofluanid and tolylfluanid.

In an embodiment, the additional substance is a guanidine fungicide. The guanidine fungicides of the present invention are preferably selected from dodine, guazantine and iminoctaadine.

In an embodiment, the additional substance is a triazine fungicide. The triazine fungicide of the present invention is preferably anilazine.

In an embodiment, the additional substance is a quinone fungicide. The quinone fungicide of the present invention is preferably dithianon.

In an embodiment, the additional substance is a cinnamaldehyde.

Other examples of fungicides which can be used are compounds belonging to the group comprising hydantoins, imidazoles, or triazoles.

Examples of herbicides which can be used are compounds belonging to the group comprising carbamates, cyclohexadiones, sulfonylureas, triazines or uracils.

In general terms, the compositions according to the invention are prepared by mixing laminarin, extracted in powder form, with customary additives, for example solid fillers and/or solvents.

In an embodiment, the composition of the present invention may contain agriculturally acceptable adjuvants, carriers, diluents, surfactants, surface-active substances, emulsifiers, fillers, anti-foaming agents, anti-freezing agents, freezing agents, preservatives etc.

Examples of solid fillers which can be used for the preparation of wettable powders or granules are finely divided kaolin or clay.

When presented in liquid form, these compositions will preferably be obtained by diluting the laminarin in water.

It is also possible to prepare spraying compositions based on oil or emulsifiable concentrate (EC), especially in the case of a mixture with additional substances which are insoluble in water.

In another aspect the present invention provides a process for preparation of composition comprising mixing laminarin with polyol and water, preferably at room temperature.

In an embodiment, the process comprises adding optionally preservative or antifoaming agent for example DrewPlus L-768 or surfactant; heating the mixture obtained and cooling down at room temperature to obtain the final product.

The surfactant may be non-ionic alkoxylates selected from $C_{10-12}$ alcohol (10 EO) Ethoxylate, Tridecyl alcohol (6EO) Ethoxylate, $C_{10}$ alcohol (5 EO) Ethoxylate, $C_8$ alcohol Ethoxylate (4 EO), C9-11 alcohol Ethoxylate (4 EO), Isodecyl alcohol (7 EO) Ethoxylate or combination thereof. Preferred surfactant may be Dodecan-1-ol ethoxylated (23EO).

The preservatives are optionally added such as, derivatives of benzoic acid, sorbic acid, formaldehyde, in particular potassium sorbate, a combination of methyl parahydroxybenzoate or propyl parahydroxybenzoate, generally in an amount from about 0.1% to about 1.0% w/w.

The antifoams/defoamers are optionally added in an amount from about 0.01% to about 2% w/w, preferably from about 0.1% to about 1.5% w/w of total weight of the composition.

The composition according to the present invention comprises at least 5% by weight, preferably at least 10% by weight and especially preferably at least 15% by weight of water based on the total weight of the composition.

The composition according to the invention comprises from about 5% to about 70% w/w, preferably from about 10% to about 60% w/w and especially preferably from about 15% to about 50% w/w of water, based on the total weight of the composition.

Examples of plants which can be treated successfully with laminarin within the framework of the use according to the invention are selected from the group comprising, but not limited to, fruit crops such as apple trees, pear trees and vines; cereals such as wheat, maize and rice; oleaginous plants such as soya, sunflower and colza; vegetables such as carrots, tomatoes, cauliflowers and potatoes.

In general, laminarin can be used in doses of between 0.005 g and 100 g per liter for treating the leaves, and of between 1 g and 100 g per 100 kg for treating the seeds.

In an embodiment, laminarin is applied with one another fungicide or an insecticide.

In an embodiment, laminarin is applied with a fungicide selected from the group consisting of a dithiocarbamate fungicide, copper, sulphur and cinnamaldehyde.

However, it should be understood that scope of the present invention is not limited by the examples in any manner. It will be appreciated by any person skilled in this art that the present invention includes aforesaid examples and further can be modified and—altered within the technical scope of the present invention. Consequently, the use of ranges of numbers expressly includes any possible sub-domains and any other individual numeric values included in this range, and any numeric values in these ranges or sub domains, together with any fractions of the said numeric values or said whole numbers within these ranges, unless the context expressly indicated otherwise. This applies in all circumstances to all number ranges and in any context throughout this application. For example, a range of numbers from 10 to 60% includes 15 to 55%, 20-50%, 25-45%, 30-40% and so on.

While the foregoing written description of the invention enables one of ordinary skill to make and use what is considered presently to be the best mode thereof, those of ordinary skill will understand and appreciate the existence of variations, its combinations, and equivalents of the specific embodiment, method, and examples herein. The invention should therefore not be limited by the above described embodiment, method, and examples, but by all embodiments and methods within the scope and spirit of the invention.

The invention will be illustrated with reference to the following examples.

EXAMPLES

Example 1

| Ingredients | Amount in percentage (%) |
| --- | --- |
| Laminarin (75 g/L) | 46.8 |
| Glycerin | 38.4 |
| Water | Q.S. |
| Total | 100 |

1. In a double jacketed vessel, laminarin technical, is mixed at room temperature with glycerin, water for 15 min.
2. The vessel is heated at 50-55° C. The mixture is stirred for 30 min at 50-55° C.
3. After cooling down at room temperature, the product is then packed.

Example 2

| Ingredients | Amount in percentage (%) |
| --- | --- |
| Laminarin (75 g/L) | 57 |
| Glycerin | 37.83 |
| Water | Q.S. |
| Total | 100 |

1. In a double jacketed vessel, laminarin technical is mixed at room temperature with glycerin, water for 15 min.
2. The vessel is heated at 50-55° C. The mixture is stirred for 30 min at 50-55° C.
3. After cooling down at room temperature, the product is then packed.

Example 3

The compositions as described in example 1 and example 2 were tested for storage stability. The CIPAC (Collaborative International Pesticides Analytical Council) method studies samples stored at 54° C. over a period of 2 weeks, 12 Months at 25° C., 3 Months at 40° C., 3 Months at −10° C. and 7 days at 0° C.

| Parameters | Conditions | Example 1 | Example 2 |
|---|---|---|---|
| Active substance content | before storage | 39.5 g/L | 46.0 g/L |
| | after storage 2 weeks at 54° C. | 38.0 g/L | 44.1 g/L |
| Appearance | before storage | Clear liquid | Clear liquid |
| | after storage 2 weeks at 54° C. | Clear liquid | Clear liquid |
| | after storage 12 Months at 25° C. | Clear liquid | Clear liquid |
| | after storage 3 Months at 40° C. | Clear liquid | Clear liquid |
| | after storage 3 Months at −10° C. | Clear liquid | Clear liquid |
| pH | before storage | 3.2 | 3.2 |
| | after storage 2 weeks at 54° C. | 3.1 | 3.0 |
| Dilution stability | before storage | Sample is 100% soluble with no separation | Sample is 100% soluble with no separation |
| | after storage 2 weeks at 54° C. | No separation, 100% soluble | No separation, 100% soluble |
| Low temperature stability | 7 days at 0° C. | No crystallization after 7 days at 0° C. | No crystallization after 7 days at 0° C. |

All the compositions prepared according to the process disclosed in the present invention were found to possess good stability profile. Further the formulations were stable at all the tested temperatures for the described storage durations.

Example 4

Field Trials:
Trials have been conducted to demonstrate the efficiency of the present composition on *Tomato Botrytis*.
Details of Experiment:
Application of composition—ABCDEF, A=early flowering, B=full flowering, C=end of flowering, then every 7-10 days.

Spray interval: 7-10 days/Spray volume: 600 L/ha, foliar spray.
Assessment on leaves: severity and incidence (%) at 0 DAA, 10 DAB, 10 DAC, 10 DAD, 10DAF, 30DAF.

Assessment on fruits: severity and incidence (%) at 0 DAA, 10 DAB, 10 DAD, 10DAF, 30DAF+two on post-harvest Phytotoxicity symptoms (%) at 0 DAA, 10DAB, 10DAD, 10DAF.

TABLE 1

Percent disease dimension

| | Foliage | | | | | | Fruits | |
|---|---|---|---|---|---|---|---|---|
| | % Incidence | | % Severity | | Intensity | | % Incidence | |
| Treatment/ dose | 10 DAC | 10 DAD | 10 DAC | 10 DAD | 10 DAC | 10 DAD | 10 DAC | 10 DAD |
| Formulation-1 3 l/ha | 16 | 37 | 10 | 26 | 2 | 9 | 0 | 9 |
| Formulation-1 0.8 l/ha | 20 | 45 | 8 | 29 | 2 | 13 | 0 | 9 |
| Untreated | 39 | 64 | 22 | 59 | 9 | 38 | 0 | 39 |

It has been observed that for all test results set out in above tables, this composition shows good efficiency for control of *Tomato Botrytis*.

Example 5

Field Trials:
Trials have been conducted to demonstrate the efficiency of the present composition also comprising of sulphur against powdery mildew (*Erysiphe* sp.) in Cumin.
Details of Experiment:
The trials were carried out at 4 locations.
2 post-emergent applications were done at an interval of 10 days. The crop was in a vegetative growth state at the time of application.
A—first application
B—second application
Spray interval: 7-10 days/Spray volume: 500 L/ha, foliar spray.
Assessment: severity and incidence (%) at 5 DA-A, 10 DA-A, 5 DA-B, 10DA-B and
Disease Control (%) at 5 DA-A, 10 DA-A, 5 DA-B, 10DA-B.

TABLE 2

Percent disease dimension in Cumin

| | Form. | | | | ERYSSP (PDI) | | | | ERYSSP (PDC) | | | |
|---|---|---|---|---|---|---|---|---|---|---|---|---|
| Treatment details | a.i. Dose rate(g/ ha) | Dose rate (ml or g/ha) | Application Timings | | 5 DAA | 10 DAA | 5 DAB | 10 DAB | 5 DAA | 10 DAA | 5 DAB | 10 DAB |
| Untreated check | — | — | — | | 16.5 | 30.1 | 44.5 | 67 | 0 | 0 | 0 | 0 |
| Laminarin 45 SL + Sulphur 80% WDG | 45 | 2000 | 1000 + 2500 | AB | 3.9 | 9.8 | 7.9 | 17.3 | 76 | 68 | 82 | 74 |
| Laminarin 45 SL + Sulphur 80% WDG | 90 | 2000 | 2000 + 2500 | AB | 3.9 | 9.1 | 7.3 | 16.6 | 76 | 70 | 84 | 75 |
| Laminarin 45 SL + Sulphur 80% WDG | 90 | 1600 | 2000 + 2000 | AB | 4.3 | 10.9 | 8.8 | 18.4 | 74 | 64 | 80 | 73 |

Example 6

Field Trials:
Trials have been conducted to demonstrate the efficiency of the present composition also comprising of copper oxychloride against citrus canker *Xanthomonas campestris* p.v. *citri* in citrus fruits lemon and kinnow.
Details of Experiment:
Age of the plants was between 8-12 years.
3 replicates were made for the experiment conducted at 4 different locations.

4 applications were made with an interval of 7 days.
A—first application
B—second application
C—third application
D—fourth application
Spray interval: 10 days/Spray volume: 10 L/tree, foliar spray.

Assessment: severity and incidence (%) at 7 DA-A, 7 DA-B, 7 DA-C, 7DA-D and

Disease Control (%) at 7 DA-A, 7 DA-B, 7 DA-C, 7DA-D.

TABLE 3

Percent disease dimension in Citrus

| Treatment details | a.i. Dose rate (g/L water) | Form. Dose rate (ml or g/L water) | XANTCI (PDI) | | | | XANTCI (PDC) | | | |
|---|---|---|---|---|---|---|---|---|---|---|
| | | | 7 DAA | 7 DAB | 7 DAC | 7 DAD | 7 DAA | 7 DAB | 7 DAC | 7 DAD |
| Untreated check | — | — | 3.33 | 18.87 | 32.93 | 56.61 | — | — | — | — |
| Laminarin 4.5% SL + Copper oxychloride 50% WP | 0.09 | 2.0 + 2.0 | 0 | 3.33 | 5.92 | 9.62 | 100 | 82.35 | 82.02 | 83.01 |
| Laminarin 4.5% SL + Copper oxychloride 50% WP | 0.11 | 2.5 + 2.0 | 0 | 2.96 | 5.55 | 8.51 | 100 | 84.31 | 83.15 | 84.97 |

Example 7

Field Trials:

Trials have been conducted to demonstrate the efficiency of the present composition also comprising of sulphur against powdery mildew (*Erysiphe* sp.) in Chili.

Details of Experiment:

The trials were carried out at 3 locations.

3 post-emergent applications were done at an interval of 7 days. The crop was in a vegetative growth state at the time of application.
A—first application
B—second application
C—third application
Spray interval: 7/Spray volume: 500 L/ha, foliar spray.

Assessment: severity and incidence (%) at 7 DA-A, 7 DA-B, 7 DA-C and Disease Control (%) at 7 DA-A, 7 DA-B, 7 DA-C.

TABLE 4

Percent disease dimension in Chili

| Treatment details | a.1. Dose rate (g/ha) | Form. rate (ml or g/ ha) Dose | PDI | | | PDC | | |
|---|---|---|---|---|---|---|---|---|
| | | | 7 DAA | 7 DAB | 7 DAC | 7 DAA | 7 DAB | 7 DAC |
| Untreated check | — | — | 7.4 | 22.2 | 43.5 | 0 | 0 | 0 |
| Laminarin 4.5% SL + Sulphur 80 WDG | 90 + 2000 | 2000 + 2500 | 2.7 | 7.9 | 13.9 | 63.1 | 64.5 | 68 |

TABLE 4-continued

Percent disease dimension in Chili

| Treatment details | a.1. Dose rate (g/ha) | Form. rate (ml or g/ha) Dose | PDI 7 DAA | PDI 7 DAB | PDI 7 DAC | PDC 7 DAA | PDC 7 DAB | PDC 7 DAC |
|---|---|---|---|---|---|---|---|---|
| Laminarin 4.5% SL + Sulphur 80 WDG | 135  1600 | 3000 + 2000 | 3 | 8.4 | 15.4 | 59.5 | 62 | 64.5 |
| Laminarin 4.5% SL + Sulphur 80 WDG | 113  2000 | 2500 + 2500 | 2.4 | 7.1 | 11.7 | 67.5 | 67.5 | 73.5 |

It is evident from the above examples that the compositions of the present invention are effective in controlling diseases in crops.

The invention claimed is:

1. A composition comprising laminarin; and a polyol, wherein the polyol is in an amount from 10 to 40% w/w of the total composition, and said composition comprises 0.005 to 100 grams of laminarin, and wherein the polyol is selected from the group consisting of mannitol, glycerin, xylitol, sorbitol, ethylene glycol, propylene glycol, butylene glycol, diethylene glycol, triethylene glycol, dipropylene glycol, and trimethylolpropane.

2. The composition as claimed in claim 1, wherein the polyol is glycerin.

3. The composition as claimed in claim 1, wherein the composition is in a liquid form.

4. The composition as claimed in claim 3, wherein the composition comprises 0.005 to 100 grams of the laminarin.

5. The composition as claimed in claim 3, wherein the composition comprises 1 to 80 grams of the laminarin.

6. The composition as claimed in claim 3, wherein the composition comprises 10 to 50 grams of the laminarin.

7. The composition of claim 1, further comprising at least one fungicide.

8. The composition as claimed in claim 7, wherein the said fungicide is a multi-site fungicide selected from copper fungicides, dithiocarbamate fungicides, phthalamide fungicides, chloronitrile fungicides, sulfamide fungicides, sulphur fungicides, guanidine fungicides, triazine fungicides, and quinone fungicides.

9. The composition as claimed in claim 8, wherein the fungicide is a sulphur fungicide.

10. The composition as claimed in claim 8, wherein the fungicide is a copper fungicide.

11. A process for preparation of a stable composition according to claim 1 comprising mixing the laminarin with the polyol and water, wherein the process further comprises adding at least one ingredient selected from the group consisting of a preservative, an antifoaming agent and a surfactant.

12. A method of treating a plant comprising applying at a locus of a plant the composition of claim 1.

* * * * *